United States Patent [19]
De Jong et al.

[11] Patent Number: 5,164,635
[45] Date of Patent: Nov. 17, 1992

[54] COMPACT FLUORESCENT LAMP HAVING A RIGIDLY CONNECTED CIRCUIT BOARD AND LAMP CAP SHELL INTEGRALLY MOLDED IN A HOUSING OF SYNTHETIC MATERIAL

[75] Inventors: Nicolaas J. De Jong; Theodoor H. Stommen, both of Eindhoven, Netherlands

[73] Assignee: U.S. Philips Corporation, New York, N.Y.

[21] Appl. No.: 810,550

[22] Filed: Dec. 19, 1991

Related U.S. Application Data

[63] Continuation of Ser. No. 650,519, Feb. 5, 1991, abandoned.

[30] Foreign Application Priority Data

Oct. 9, 1990 [NL] Netherlands ............... 9002186

[51] Int. Cl.⁵ .................................... H05B 41/00
[52] U.S. Cl. ................................. 315/58; 315/32; 315/326; 361/399
[58] Field of Search ................ 315/32, 56, 57, 58, 315/326; 361/397, 399, 415; 362/362, 368

[56] References Cited

U.S. PATENT DOCUMENTS

| | | | |
|---|---|---|---|
| 3,662,381 | 5/1972 | Steffens | 315/52 X |
| 4,463,282 | 7/1984 | Eggers | 315/57 X |
| 4,739,222 | 4/1988 | Nomoto et al. | 315/50 X |

*Primary Examiner*—David Mis
*Attorney, Agent, or Firm*—Brian J. Wieghaus

[57] ABSTRACT

The electric lamp has a light source and an integral assembly of a lamp cap shell and a printed circuit board rigidly connected to said shell. A housing is formed of synthetic material in which said circuit board and an end portion of said light source are embedded. The synthetic material extends through an aperture in said shell, forming an insulative base portion. The electric lamp is of simple construction that allows for easy manufacture.

16 Claims, 1 Drawing Sheet

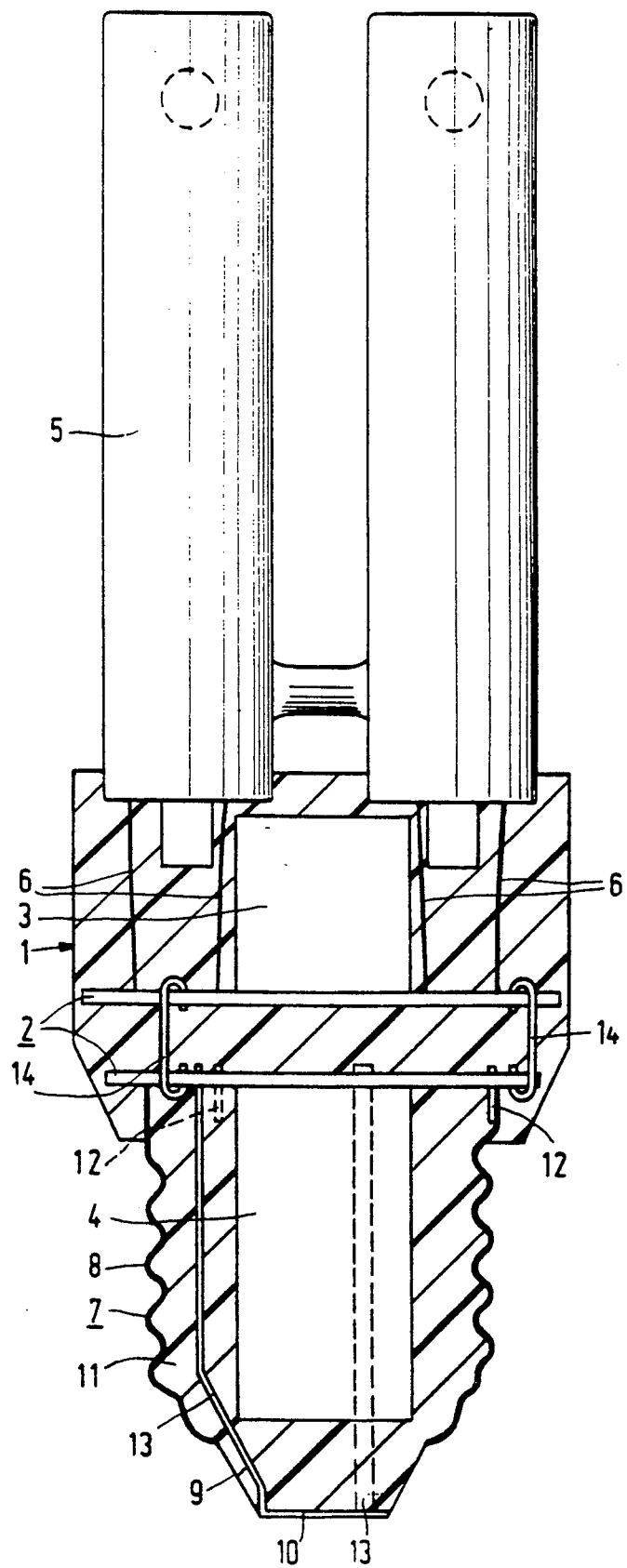

COMPACT FLUORESCENT LAMP HAVING A RIGIDLY CONNECTED CIRCUIT BOARD AND LAMP CAP SHELL INTEGRALLY MOLDED IN A HOUSING OF SYNTHETIC MATERIAL

This is a continuation of application Ser. No. 07/650,519, filed Feb. 5, 1991 now abandoned.

BACKGROUND OF THE INVENTION

1. Field of the Invention

The invention relates generally to electric lamps having a housing which includes an electronic ballast, such as compact fluorescent lamps.

2. Description of the Prior Art

DE GM 8,701,424 discloses a discharge lamp having a housing in which a printed circuit board with electric circuitry for operating the lamp is accommodated. A light source is fastened to the housing and connected electrically to the circuitry. A lamp cap having a shell and a base is fastened to the housing and has contacts connected to the circuitry. The circuitry is embedded in a synthetic resin which fills the housing. The manufacture of the lamp is comparatively time-consuming owing to the large number of components that have to be assembled.

SUMMARY OF THE INVENTION

The invention has for its object to provide a lamp of the kind described in the opening paragraph which is of a simple construction.

This object is realised in that the synthetic resin in which the circuitry is embedded also constitutes the housing.

The lamp may be obtained in a very simple manner in that the assembly of light source, circuitry, and lamp cap, in which all electrical connections have been made, is introduced into a mould which is then filled with the synthetic resin.

The construction and the simple method of manufacture which is made possible by the construction have a number of important advantages.

Electrical connections among components of the circuitry, between the circuitry and the contacts of the lamp cap, and between the circuitry and the light source can be made simultaneously or in immediate succession. If an Edison lamp cap is used, a connection with the circuitry at the inside of the shell of the lamp cap can be made, for example with solder. The result is that a major defect cannot arise. This defect, for which conventional lamps are specially inspected, consists in that the conductor, which is normally fastened at the outside of an Edison lamp cap to its shell, extends to beyond this fastening, for example alongside the light source. It is then possible to touch this conductor while it carries the mains voltage.

Other intermediate manufacturing steps, such as the mounting of the circuitry in the housing and fastening of the lamp cap to the housing, are avoided.

Other steps which are avoided are the manufacture, supply, and use of a separate housing, and also the fastening of the lamp cap to the housing, for example with glue, or through local deformation of the lamp cap after assembly.

The construction of the lamp according to the invention renders a very compact lamp possible.

In a favourable embodiment, the shell of the lamp cap is connected to the printed circuit board by means of a rigid conductor. This facilitates handling of the assembly before the lamp has been finished by the application of the synthetic resin. Also in the case of a bayonet lamp cap, where the shell does not form a contact, this construction can be used in that the conductor is connected mechanically to the plate, but not electrically to the circuitry thereon.

It can be advantageous to use two or more of such rigid conductors. The conductors may then be integral with the shell, or in the form of pins or strips fastened thereto, for example with a weld.

In an advantageous embodiment, the synthetic resin in which the circuitry is embedded and which also forms the housing is at the same time the base of the lamp cap. A contact at this base is electrically insulated from the shell in this way. An advantage of this embodiment is that an inexpensive lamp cap is used, the shell being without a previously formed vitrite base. Furthermore, the absence of the vitrite means that more space is available inside the lamp cap, for example for an electrolytic capacitor.

In a favourable modification of this embodiment, a contact of the base portion is connected to the circuitry by a rigid conductor. Two such contacts may be connected to the circuitry in this way in lamps having a bayonet lamp cap.

This modification avoids the use of wires for making the said connection and provides a rigid, easy to handle assembly already before the synthetic resin is provided.

Examples of synthetic resin which may be used are epoxy resin, polyurethane resin, polyether imide, and polyether sulfon. They may contain, for example, up to 50% by weight of filler, powder or fibres, for example, $SiO_2$, $CaCO_3$, $Al_2O_3$.

BRIEF DESCRIPTION OF THE DRAWING

An embodiment of the lamp according to the invention is shown in the drawing in side elevation, partly in longitudinal section.

DESCRIPTION OF THE PREFERRED EMBODIMENTS

In the drawing, the electric lamp has a housing 1 in which a printed circuit board 2 comprising circuitry for operating the lamp is included. A transformer 3 and an electrolytic capacitor 4 of the circuitry are visible. The printed circuit board 2 consists of two parts. The parts are interconnected by rigid conductors 14.

A light source 5 is fastened to the housing and electrically connected to the circuitry 3, 4, in the drawing by means of conductors 6. The light source drawn is a compact low-pressure mercury discharge lamp with a quadruple lamp vessel which has a fluorescent powder coating.

A lamp cap 7 having a shell 8 and a base 9 and provided with contacts, is fastened to the housing 1. The lamp cap 7 has a first contact 10 at the base 9 and, in the Edison lamp cap drawn, the shell itself as a second contact. The contacts 8, 10 are connected to the circuitry 3, 4. The circuitry 3, 4 is embedded in a synthetic resin 11 which fills the housing 1. The synthetic resin 11 at the same time constitutes the housing 1 itself.

In the drawing, the shell 8 of the lamp cap 7 is connected to the printed circuit board 2 by a rigid conductor 12. The conductor 12 is fastened to the inside of the shell 8 by means of welding. The conductor 12 is fastened to the board 2, electrically connected to the circuitry 3, 4.

The synthetic resin 11 in which the circuitry 3, 4 is embedded and which at the same time constitutes the housing 1, also forms the base 9 of the lamp cap in the drawing. The contact 10 at the base 9 is electrically connected to the circuitry 3, 4 by a rigid conductor 13, two of such conductors being visible in the lamp drawn.

During manufacture of the lamp, all electrical connections are made first. Owing to the construction as drawn, rigid connections between the printed circuit board 2, the shell 8 of the lamp cap 7, and the contact 10 at its base 9 were thus created at the same time. The substantially rigid assembly is then placed in a mould, after which the synthetic resin is introduced.

We claim:

1. An electric lamp, comprising:
   a light source,
   a circuit board having electric circuitry for operating said light source;
   a lamp cap comprising a shell and an insulative base portion each having a respective contact connected to said circuitry;
   means for rigidly connecting said lamp cap shell to said printed circuit board; and
   a housing comprised of a synthetic material in which said circuit board and an end portion of said light source are integrally embedded, said synthetic material extending through said lamp cap shell and forming said base portion.

2. An electric lamp as claimed in claim 1, characterized in that said lamp cap is an Edison lamp cap and said connecting means comprises a rigid conductor fastened to the inside of said shell.

3. An electric lamp as claimed in claim 2, characterized in that a rigid conductor connects said lamp base contact to said printed circuit board.

4. An electric lamp, comprising:
   a) a light source having an end portion,
   b) an integral assembly comprised of a printed circuit board having electric circuitry for operating said light source and a metallic lamp cap shell rigidly connected to said circuit board; and
   c) a housing comprised of a synthetic material in which said end portion of said light source and said circuit board are integrally embedded, said synthetic material extending into said shell for securing said shell thereto.

5. An electric lamp according to claim 4, wherein a rigid metallic conductor connects said circuit board to an inner surface of said shell.

6. An electric lamp according to claim 5, wherein said shell comprises an electric contact of said lamp and said rigid conductor connects said shell to said circuitry on said circuit board.

7. An electric lamp according to claim 6, wherein said shell has an aperture, and said synthetic material extends through said shell and said aperture, forming an insulative lamp cap base protruding from said shell.

8. An electric lamp according to claim 7, wherein said lamp includes a second electric contact electrically connected to said circuitry on said circuit board, and said integral assembly comprises said second contact and a second rigid conductor connected to said circuit board and extending through said aperture for positioning said second contact in said insulative lamp cap base.

9. An electric lamp according to claim 8, wherein said light source is a fluorescent low pressure mercury vapor discharge lamp having adjacent ends embedded in said synthetic material.

10. An electric lamp according to claim 4, wherein said shell has an aperture, and said synthetic material extends through said shell and said aperture, forming an insulative lamp cap base protruding from said shell.

11. An electric lamp according to claim 10, wherein said lamp includes an electric contact electrically connected to said circuitry on said circuit board, and said integral assembly comprises said contact and a rigid conductor connected to said circuit board and extending through said aperture for positioning said contact in said insulative lamp cap base.

12. An electric lamp according to claim 4, wherein said light source is a fluorescent low pressure mercury vapor discharge lamp having adjacent ends embedded in said synthetic material.

13. A compact fluorescent lamp, comprising:
   a) a fluorescent low pressure mercury vapor discharge vessel having a pair of adjacent ends;
   b) an integral assembly comprised of a printed circuit board having electric circuitry for energizing said discharge vessel to emit light, a threaded metallic shell rigidly secured to said circuit board and electrically connected to said circuitry, said shell having an aperture at its end remote from said circuit board, an elongate support extending from said circuit board through said aperture and terminating at an end adjacent thereto, and a lamp contact connected to said circuitry and fixed on the end of said support adjacent said aperture,
   c) a housing of synthetic material in which said adjacent ends of said discharge vessel, said circuit board, and said elongate support are integrally embedded, said synthetic material protruding through said aperture and forming an insulative base portion at said remote end of said shell with an end face, said support extending through said shell and positioning said contact at said end face of said insulative base portion.

14. A compact fluorescent lamp according to claim 13, wherein said threaded shell and said insulative base portion define an Edison lamp cap.

15. A compact fluorescent lamp according to claim 14, wherein said circuitry includes a capacitor fixed to said circuit board and disposed substantially within said shell.

16. A compact fluorescent lamp according to claim 13, wherein said circuitry includes a capacitor fixed to said circuit board and disposed substantially within said shell.

* * * * *